US012667227B2

(12) United States Patent
Johns et al.

(10) Patent No.: US 12,667,227 B2
(45) Date of Patent: Jun. 30, 2026

(54) INTERLOCK MECHANISM

(71) Applicant: KENWOOD LIMITED, Havant (GB)

(72) Inventors: Martin Johns, Havant (GB); David Faram, Havant (GB); Aaron Wilcock, Havant (GB); Dan Vacher, Havant (GB)

(73) Assignee: KENWOOD LIMITED, Havant (GB)

( * ) Notice: Subject to any disclaimer, the term of this patent is extended or adjusted under 35 U.S.C. 154(b) by 493 days.

(21) Appl. No.: 16/604,192

(22) PCT Filed: Sep. 19, 2017

(86) PCT No.: PCT/GB2017/052785
§ 371 (c)(1),
(2) Date: Oct. 10, 2019

(87) PCT Pub. No.: WO2018/051143
PCT Pub. Date: Mar. 22, 2018

(65) Prior Publication Data
US 2020/0060479 A1 Feb. 27, 2020

(30) Foreign Application Priority Data

Sep. 19, 2016 (GB) ...................................... 1615936

(51) Int. Cl.
*A47J 43/06* (2006.01)
*A47J 43/07* (2006.01)
(Continued)

(52) U.S. Cl.
CPC .......... *A47J 43/06* (2013.01); *A47J 43/0766* (2013.01); *A47J 43/08* (2013.01); *B26D 1/03* (2013.01); *B26D 1/28* (2013.01); *B26D 2210/02* (2013.01)

(58) Field of Classification Search
CPC .... A47J 43/06; A47J 43/0761; A47J 43/0766; A47J 43/08; B26D 1/03; B26D 1/28; B26D 2003/288; B26D 2210/02; B26D 3/11
See application file for complete search history.

(56) References Cited

U.S. PATENT DOCUMENTS 411,372 A 9/1889 Blume et al.
3,612,414 A 10/1971 Nevison et al.
(Continued)

FOREIGN PATENT DOCUMENTS

CN 202775968 U 3/2013
CN 104665631 A 6/2015
(Continued)

OTHER PUBLICATIONS

European Exam Report dated Apr. 9, 2020 for Application No. 19 179 822.2 (5 pages).
(Continued)

*Primary Examiner* — Jennifer S Matthews
(74) *Attorney, Agent, or Firm* — Brian J. Colandreo; Jeffrey T. Placker; Holland & Knight LLP

(57) ABSTRACT

A drive interlock mechanism for an accessory for a food processor having a rotating drive, comprising: an engagement formation for engaging the rotating drive; a cooperating member for cooperating with the accessory so as to move the engagement formation into engagement with the rotating drive; and means for urging the engagement member away from the rotating drive so as to disengage the engagement member from the rotating drive.

8 Claims, 12 Drawing Sheets

(51) Int. Cl.
    *A47J 43/08*         (2006.01)
    *B26D 1/03*         (2006.01)
    *B26D 1/28*         (2006.01)

(56)           References Cited

U.S. PATENT DOCUMENTS

| | | | | |
|---|---|---|---|---|
| 4,095,751 | A | 6/1978 | Artin | |
| 4,190,208 | A * | 2/1980 | Schaeffer | A47J 43/06 |
| | | | | 241/282.2 |
| 4,199,112 | A * | 4/1980 | McLean | A47J 43/06 |
| | | | | 241/273.2 |
| 5,354,129 | A | 10/1994 | Yowell | |
| 5,680,997 | A * | 10/1997 | Hedrington | A47J 43/255 |
| | | | | 241/169.1 |
| 6,035,771 | A * | 3/2000 | Conran | A47J 43/082 |
| | | | | 241/199.12 |
| 7,059,241 | B2 * | 6/2006 | Lin | A47J 19/027 |
| | | | | 99/511 |
| 10,092,138 | B2 * | 10/2018 | Gushwa | A47J 43/0716 |
| 2007/0144358 | A1 | 6/2007 | Huang | |
| 2013/0220764 | A1 | 8/2013 | Choi et al. | |
| 2014/0203127 | A1 | 7/2014 | Merl | |
| 2014/0261019 | A1 | 9/2014 | Conti et al. | |
| 2014/0262669 | A1 * | 9/2014 | Conti | F16D 7/044 |
| | | | | 192/56.61 |
| 2014/0263783 | A1 | 9/2014 | Benoit et al. | |
| 2016/0278578 | A1 | 9/2016 | Shanmugam | |
| 2017/0340169 | A1 * | 11/2017 | Brunner | A47J 43/0716 |
| 2018/0043564 | A1 * | 2/2018 | Zakowski | A47J 43/046 |
| 2018/0353014 | A1 * | 12/2018 | Antkowiak | B26D 3/11 |
| 2019/0150671 | A1 | 5/2019 | Williams et al. | |

FOREIGN PATENT DOCUMENTS

| | | | | |
|---|---|---|---|---|
| CN | 105816071 A | * | 8/2016 | |
| CN | 105965579 A | * | 9/2016 | B26D 1/25 |
| DE | 3404348 A1 | | 8/1985 | |
| DE | 3546506 A1 | | 3/1987 | |
| EP | 2408598 A2 | | 1/2012 | |
| EP | 2433533 A1 | | 3/2012 | |
| EP | 2559362 A1 | | 2/2013 | |
| EP | 3275354 A1 | | 1/2018 | |
| EP | 3281572 A1 | | 2/2018 | |
| GB | 2305598 A | | 4/1997 | |
| GB | 2327864 A | | 2/1999 | |
| GB | 2445953 A | | 7/2008 | |
| GB | 2497085 A | | 6/2013 | |
| WO | WO-8905113 A1 | * | 6/1989 | |
| WO | WO-2010106284 A2 | * | 9/2010 | A47J 43/046 |
| WO | WO-2015193610 A1 | * | 12/2015 | A47J 43/046 |
| WO | 2017-013337 A1 | | 1/2017 | |
| WO | 2017-100859 A1 | | 6/2017 | |

OTHER PUBLICATIONS

European Exam Report dated Apr. 9, 2020 for Application No. 17 771 569.5 (6 pages).

International Search Report and Written Opinion issued in PCT/GB2017/052785, mailed Jan. 15, 2018; ISA/EP.

Extended European Search Report of the European Patent Office issued in Application No. EP19179822.2, completed Aug. 28, 2019.

GB Search Report of the Intellectual Property Office issued in Application No. GB1615936.0, claims 1-30, 68 (and 49-53, 69 in part), dated Jan. 24, 2017.

GB Search Report of the Intellectual Property Office issued in Application No. GB1615936.0, claims 54-61 & 70, dated Sep. 28, 2017.

International Preliminary Report on Patentability issued in PCT/GB2017/052785, dated Mar. 19, 2019.

Chinese Office Action dated Aug. 30, 2021 for Application No. 201780058964.3 (with English translation) (16 pages).

European Exam Report dated May 7, 2021 for Application No. GB1615936.0 (6 pages).

Examination Report for corresponding Application No. GB 1615936.0 dated Jul. 19, 2021 (3 Pages).

Vinsani 3 in 1 Spiral Slicer, available for sale on Amazon since Sep. 24, 2015, Vinsani ® 3 in 1 Blade Vegetable Fruit Spiral Cutter Chopper Twister Slicer Cutter Peeler (Green & White) : Amazon. co.uk: Home & Kitchen <https://protect-us.mimecast.com/s/nFzUCDKY16CjxpY0HWtQor?domain=amazon.co.uk>, 7 Pages.

Gefu Spiral Cutter, available on Amazon since Aug. 17, 2009, Gefu Spirelli Spiral Cutter : Amazon.co.uk: Home & Kitchen <https://protect-us.mimecast.com/s/OxPICERZ81H1qy4Mfwge6d?domain=amazon.co.uk>, 7 Pages.

Decision of Rejection for Application No. 2017800589643, dated Aug. 8, 2022 (8 pages).

\* cited by examiner

INTERLOCK MECHANISM

CROSS-REFERENCE TO RELATED APPLICATIONS

This application is a 371 U.S. National Phase of International Application No. PCT/GB2017/052785, filed Sep. 19, 2017 and published in English as WO 2018/051143 A1 on Mar. 22, 2018, which claims the benefit of Great Britain Application No. GB1615936.0, filed on Sep. 19, 2016. The disclosure of each of the above-identified applications is incorporated herein by reference.

DESCRIPTION

The present invention relates to a drive interlock mechanism. The present invention also relates to a cutting tool and an adaptor for a cutting tool.

Spiralising is a food processing method for producing long and thin ribbons of food. Typically, spiralising is used to produce low carbohydrate alternatives to spaghetti or noodles from root vegetables.

In a known spiralising method, an ingredient is manually mounted into a device that pushes and rotates the ingredient onto a blade arrangement. This method relies upon the user reloading the spiralising device once the ingredient has been processed, and fails to allow for continuous sequential processing of several ingredients.

Some existing kitchen machines provide the ability to spiralise ingredients; however, these machines require high levels of user input, suffer from usability issues, and/or are dedicated single-purpose device.

The present invention is directed at least partially to ameliorate the above-described problems.

In an aspect of the invention, there is provided an adaptor for a food processor (for example, a bottom-driven food processor or a stand mixer) comprising a rotating drive (for example, for rotating a central spindle of a food processor), the adaptor being in the form of a frame (preferably, herein also referred to as a "body"), said adaptor comprising: a formation for enabling the frame to be supported by the food processor; and a support for a cutting tool, wherein the frame is arranged to permit the cutting tool to pick up drive from the rotating drive so as to allow the cutting tool to rotate about an axis that is offset from the axis of rotation of the rotating drive. Preferably, the term "offset" includes any non-coincidental axes.

Preferably, the frame is arranged to support the cutting tool to pick up drive at a location spaced apart from the axis of rotation of the cutting tool. Preferably, the frame is arranged to support the cutting tool to pick up drive only at a location spaced apart from the axis of rotation of the cutting tool.

Preferably, the frame is adapted to be fixed (preferably, in use) relative to the food processor.

Preferably, the adaptor does not comprise a spindle for the cutting tool to rotate about.

The formation may be adapted to cooperate with the food processor, and preferably the formation is a bayonet or screw fitting coupling.

The formation may engage with the food processor to prevent rotation and/or bodily movement of the frame with the rotating drive; preferably, the adaptor is bodily static in use. Preferably, the formation is adapted to be affixed to the food processor so as to permit the cutting tool to rotate relative to the frame.

Preferably, the formation is spaced apart from the axis of rotation of the cutting tool. Preferably, the formation is only provided at a location spaced apart from the axis of rotation of the cutting tool.

The frame may be arranged to support the cutting tool at a location spaced apart from the axis of rotation of the cutting tool, and preferably adjacent a perimeter of the cutting tool. Preferably, the frame is arranged to support the cutting tool only at a location spaced apart from the axis of rotation of the cutting tool, and preferably only adjacent a perimeter of the cutting tool.

The frame may include an aperture through which food processed by the cutting tool is available to pass when the cutting tool is supported by the frame. Preferably, the aperture is coaxial with the axis of rotation of the cutting tool.

The cutting tool may comprise a cutting member. Preferably, the aperture may be dimensioned (e.g. its bore diameter) to be at least as large as an area traced by the cutting member when rotating (e.g. when having completed a full revolution). Preferably, the aperture is dimensioned to have a width at least twice that of the cutting tool.

The aperture may be offset from the axis of rotation of the rotating drive.

Preferably, the support comprises a retaining formation for preventing the cutting tool from rotating (e.g. by orbiting) about the axis of rotation of the rotating drive.

Preferably, the support is arranged so as to retain the cutting tool in a fixed position, and more preferably the support is dimensioned no larger than that needed to receive the cutting tool.

Preferably, the support is in the form of a flange, preferably wherein the flange is recessed within the frame.

Preferably, the support is arranged so as to support a base of the cutting tool, and more preferably so as to support only a base of the cutting tool.

Preferably, the adaptor further comprises an aperture for receiving the rotating drive of the food processor.

Preferably, the aperture for receiving the rotating drive of the food processor has a diameter that is substantially the same as the diameter of the rotating drive, the aperture thereby acting as a bushing or bearing for the rotating drive.

Preferably, the aperture for receiving the rotating drive of the food processor has a diameter that is substantially larger than the diameter of the rotating drive, thereby to provide clearance between the rotating drive and the aperture.

Preferably, the adaptor further comprises an engagement formation for engaging the rotating drive of the food processor.

Preferably, the adaptor comprises a transmission for transmitting drive from the rotating drive to the cutting tool.

The transmission may be adapted to translate drive perpendicularly. Preferably, the transmission is reversible by the rotating drive so as to permit reversal of the cutting tool.

Preferably, the transmission and/or engagement is/are also the support for the cutting tool.

Preferably, the transmission includes a gear, for example an internal gear and/or a ring gear.

Preferably, the frame is arranged to support the cutting tool to pick up drive directly from the rotating drive, and more preferably the adaptor comprises no intermediate transmission between the cutting tool and the food processor.

Preferably, the formation is adapted to cooperate with at least one of: a lip, a rim or an internal wall of a bowl of the food processor; a formation on the bowl for supporting a lid for the bowl; or a drive outlet of the food processor.

Preferably, the adaptor is arranged to fit within the bowl.

The adaptor or food processor may be provided with a lid. Preferably, the formation is adapted to cooperate with the lid, and more preferably to engage with the lid.

Preferably, the frame is configured to align the cutting tool with a feed tube of the lid when the cutting tool is supported by the frame.

Preferably, the adaptor comprises a safety interlock for engaging the engagement formation with the rotating drive of the food processor only when the food processor is fitted with a lid, bowl and/or cutting tool.

The frame may be orientated to support the cutting tool so that the axis of rotation of the cutting tool is parallel to the axis of rotation of the rotating drive of the food processor.

Preferably, the frame comprises a hollow spindle about which the cutting tool rotates.

Preferably, when the cutting tool is supported by the frame, the hollow spindle extends only towards the cutting tool. Preferably, the hollow spindle is no longer than the depth of the cutting tool.

Preferably, the adaptor comprises at least two supports for the cutting tool, wherein the frame may be arranged simultaneously to permit the at least two cutting tools to pick-up drive from the rotating drive.

Preferably, the frame is sufficiently rigid so as to accept a downward force when food is pressed against the cutting tool.

Preferably, the cutting tool is permitted to spin when supported in the frame, and preferably to rotate only by spinning.

Preferably, the food processor is a stand mixer.

Preferably, the support comprises a bearing for permitting the cutting tool to rotate, and preferably for permitting the cutting tool to rotate clockwise and anti-clockwise. The bearing may comprise a plain bearing or a ball bearing Preferably, the adaptor further comprises a blocking member for blocking food from coinciding with the axis of rotation of the cutting tool when food is being processed by the cutting tool.

According to another aspect of the invention, there is a cutting tool for a food processor having a rotating drive, the cutting tool comprising: a cutting member; and an engagement formation for picking up drive from the rotating drive so as to rotate the cutting member, wherein the engagement formation is spaced apart from the axis of rotation of the cutting tool.

Preferably, the cutting tool does not comprise a spindle about which it rotates.

Preferably, the engagement formation is only provided at a location spaced apart from the axis of rotation of the cutting tool. Preferably, the engagement formation is provided adjacent the periphery of the cutting tool, and more preferably the engagement formation is only provided adjacent the periphery of the cutting tool. The cutting tool may be substantially flat. Preferably, the engagement formation surrounds and/or encircles the periphery of the cutting tool.

Preferably, the engagement formation is only provided adjacent the periphery of the cutting tool Preferably, the cutting tool includes an aperture that is coaxial with the axis of rotation of the cutting tool when the cutting tool picks-up drive by means of the engagement formation.

Preferably, the cutting tool further comprises a corer or a prong arranged coaxially with the axis of rotation of the cutting tool.

Preferably, the cutting tool further comprises a further cutting member.

Preferably, the further cutting member is orientated to cut at least in the same direction as the cutting member.

The cutting tool may comprise a reversed cutting member orientated to cut in a different direction to the cutting member, and preferably in an opposite direction to the cutting member.

Preferably, at least one of the cutting members is removable.

Preferably, at least one of the cutting members extends radially away from the axis of rotation.

Preferably, at least one of the cutting members extends perpendicularly to the axis of rotation of the cutting tool.

Preferably, the cutting tool comprises a surface for supporting food, and more preferably wherein the surface is flat, and more preferably still wherein the surface is perpendicular to the axis of rotation of the cutting tool.

Preferably, at least one of the cutting members is parallel with the surface for supporting food.

Preferably, at least one of the cutting members terminates, in a radial direction, before the axis of rotation of the cutting tool, and more preferably before the aperture that is coaxial with the axis of rotation of the cutting tool.

Preferably, at least two of the cutting members are configured to cut in substantially perpendicular planes relative to one another.

Preferably, at least one of the cutting members comprise: a comb-like blade; a straight, curved or serrated blade for slicing; a julienne blade; a peeler; a shredder; and/or a grater.

Preferably, the cutting tool comprises a bearing for permitting the cutting tool to rotate, and more preferably for permitting the cutting tool to rotate clockwise and anti-clockwise.

Preferably, the engagement formation is configured to engage directly with an engagement formation as described above so as to pick up drive directly from the adaptor.

The cutting tool may be circularly symmetric, and preferably the cutting tool is substantially disk- or cone-shaped.

Preferably, the engagement formation is the widest part of the cutting tool. Preferably, the cutting tool is configured so as only to be supported from below.

According to yet another aspect of the invention, there is provided a food processing attachment for a food processor comprising a rotating drive, the attachment comprising: an adaptor as described above; and a cutting tool as described above for use with the adaptor.

Preferably, the cutting tool is removable from the adaptor.

Preferably there is provided at least two cutting tools, wherein each cutting tool comprises different cutting members.

In a further aspect of the invention, there is provided a drive interlock mechanism for an accessory for a food processor (for example, as described above) having a rotating drive comprising: an engagement formation for engaging the rotating drive; a cooperating member for cooperating with the accessory so as to move the engagement formation into engagement with the rotating drive; and means for urging the engagement member away from the rotating drive so as to disengage the engagement member from the rotating drive.

Preferably, the cooperating member cooperates with the accessory when the accessory is fitted to the food processor; and wherein the means for urging urges the engagement member when the accessory is not fitted to the food processor.

Preferably, the cooperating member cooperates with the accessory so as to urge the engagement formation into engagement with the rotating drive whilst, and more preferably only whilst, the accessory is fitted to the food processor.

Preferably, the engagement formation is configured to provide drive to the attachment.

Preferably, the cooperating member is attached to the engagement formation, and more preferably wherein the cooperating member is formed as part of the engagement formation.

Preferably, the cooperating member comprises a flange configured to be moved as the accessory is fitted to the attachment or food processor. The engagement formation may be a gear and the means for urging may be a spring.

Preferably, the accessory is for a tool, wherein the tool is arranged to engage with the food processor.

Preferably, the accessory is a lid or a bowl, or an attachment for the food processor comprising a lid and/or bowl.

Preferably, the lid and/or bowl comprise a complementary surface for cooperating with the cooperating member (and optionally the engagement formation) so as to urge the engagement formation into engagement with the rotating drive when the accessory is fitted to the food processor.

Preferably, the engagement member, cooperating member and the means for urging are provided as part of an accessory for a food processor.

Preferably, the cooperating member directly engages the accessory so as to move the engagement formation into engagement with the rotating drive.

Preferably, the cooperating member engages the accessory via a transmission (for example a transmission shaft) so as to move the engagement formation into engagement with the rotating drive.

Preferably, the engagement formation is a gear and the rotating drive comprises a geared output.

Preferably, the food processor is a stand mixer, and the rotating drive is a horizontal drive output of the stand mixer.

Preferably, the adaptor described above comprises a drive interlock mechanism as also described above. Preferably, the cutting tool as described above comprises a drive interlock mechanism as described above.

According to a yet a further aspect of the invention, there is provided a cutting plate for a food processor, comprising: a first cutting member; and a second cutting member orientated to cut in an opposite direction to the first cutting member. Preferably, the second cutting member is separate from the first cutting member.

Preferably, the cutting plate is a rotating cutting plate, and wherein the second cutting member is orientated to cut in an opposite direction to the first cutting member when the cutting plate rotates in a given direction.

Preferably, the second cutting member is on an opposite surface of the cutting plate to the first cutting member.

Preferably, the radial dimension of the second cutting member is no smaller than the radial dimension of the first cutting member.

Preferably, the first and/or second cutting members are removable from the cutting plate.

Preferably, the food processor comprises an adaptor, a cutting tool, a drive interlock mechanism and/or a cutting plate each as described above.

Preferably, the rotating drive comprises a spindle comprising gear teeth for driving the cutting tool.

An adaptor substantially as herein described with reference to and/or as shown in the accompanying drawings. A cutting tool substantially as herein described with reference to and/or as shown in FIGS. 1-3 and 9. A drive interlock mechanism substantially as herein described with reference to and/or as shown in FIG. 8. A cutting plate substantially as herein described with reference to and/or as shown in FIGS. 1-3 and 9. A food processor substantially as herein described with reference to and/or as shown in FIGS. 2-5, 8 and 9.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word or can be interpreted in the exclusive or inclusive sense unless stated otherwise.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances.

The invention described here may be used in any kitchen appliance and/or as a stand-alone device. This includes any domestic food-processing and/or preparation machine, including both top-driven machines (e.g. stand-mixers) and bottom-driven machines (e.g. blenders). It may be implemented in heated and/or cooled machines. It may be used in a machine that is built-in to a work-top or work surface, or in a stand-alone device. The invention can also be provided as a stand-alone device, whether motor-driven or manually powered.

One or more aspects will now be described, by way of example only and with reference to the accompanying drawings having like-reference numerals, in which.

SPECIFIC DESCRIPTION

Figure 1:
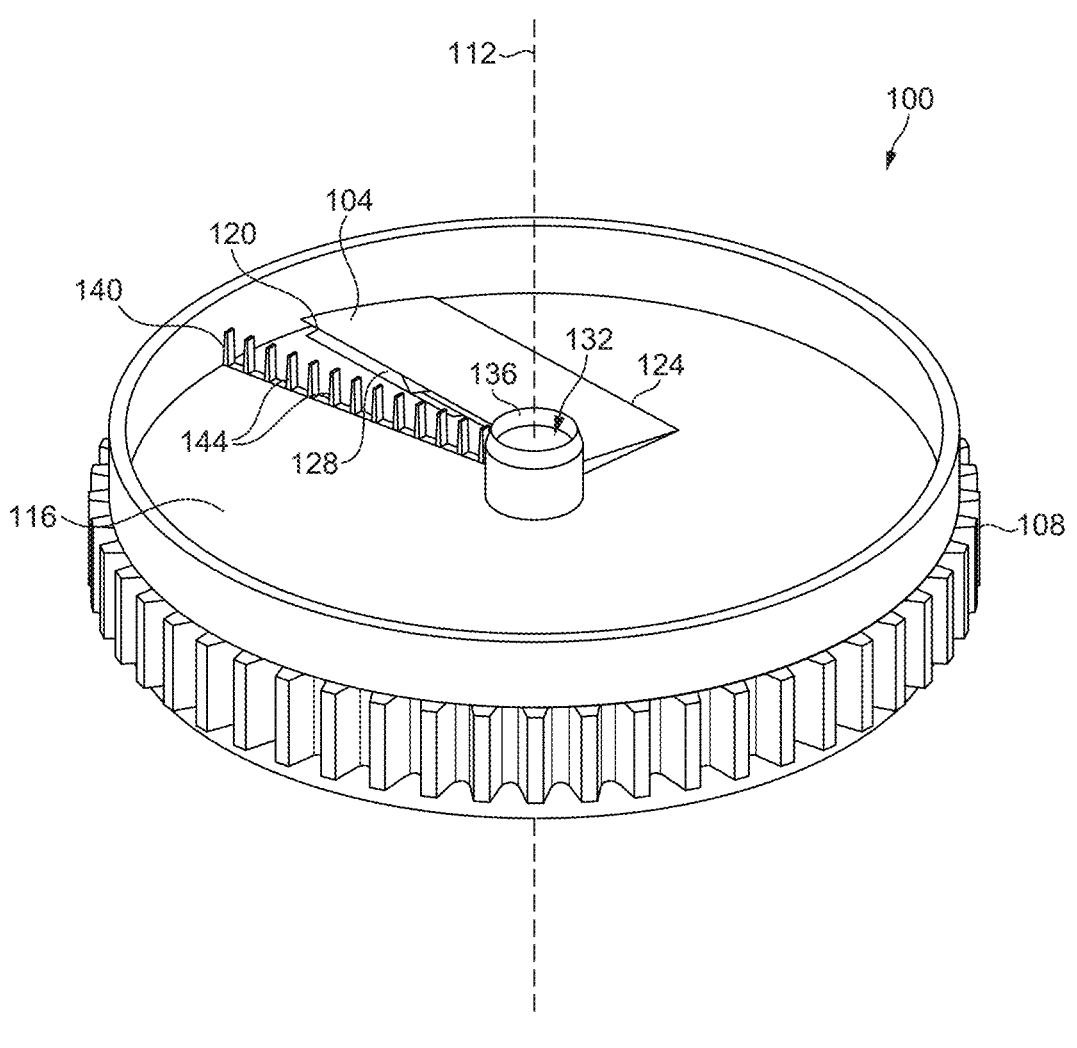
FIG. 1 shows a cutting tool according to the present invention.

FIG. 1 shows a cutting tool 100 for a food processor according to the present invention. The cutting tool 100 comprises a cutting member in the form of a main blade 104, and an engagement formation 108, for picking up drive from a rotating drive of a food processor (not shown), in the form of a ring gear. The cutting tool 100 is rotatable, when the engagement formation 108 picks up drive, about an axis of rotation 112. The axis of rotation 112 is located centrally on the cutting tool and the engagement formation 108 is located away from—that is, at a location spaced apart from—the axis of rotation 112 and at a periphery of the cutting tool 100.

The cutting tool 100 is provided as a flat disc, with the engagement formation 108 wrapping around the entire periphery of the cutting tool such that the cutting tool 100 is capable of being rotated about axis 112 continuously.

The cutting tool 100 further comprises a circular plate 116, upon which the main blade 104 is mounted. The engagement formation 108 extends perpendicularly above and below the plate 116, such that the plate 116 is located approximately at a midpoint of the height of the engagement formation 108. The ring gear allows the cutting tool 100 to be driven in both rotational directions.

The main blade 104 comprises a cutting edge 120 extending radially across the plate 116 to the engagement formation 108, such that the cutting edge is substantially parallel to a radius of the plate 116. The main blade 104 is supported on the plate 116 at an end 124 opposite to the cutting edge 120, such that the main blade 104 is inclined relative to the plate 116. An aperture 128 is provided between the plate 116 and the cutting edge 120 such that foodstuff cut by the main blade 104 passes through the aperture 128 as the cutting tool 100 is rotated.

The cutting tool 100 is arranged to rotate and to receive foodstuff (such as a vegetable) coincidental with the axis of rotation 112, thereby to cause the main blade 104 to be in continuous contact with foodstuff as the cutting tool rotates. Further to ensure continuous contact, foodstuff is urged against the cutting tool and into contact with the plate 116 (e.g. by hand or by a pusher for an inlet chute).

Continuous cutting of the foodstuff by the main blade 104 produces a continuous helical ribbon of processed foodstuff centred about axis 112. The processed foodstuff may be referred to as 'spiralised' or 'julienned'. The angle presented by the main blade 104 in relation to the plate 116 determines the thickness of the ribbon (typically 3 mm-10 mm, and in particular 4 mm-6 mm); this angle also causes the main blade 104 to urge processed foodstuff through the aperture 128 and hence through the cutting tool also.

In order to allow effective spiralising, a central aperture 132 is provided on the plate 116. The main blade 104 extends radially up to the central aperture 132. A remnant core of processed foodstuff (which is not cut by the main blade 104) is allowed to pass through the central aperture 132; this helps to ensure that the portions of the foodstuff surrounding the core remain in continuous contact with the main blade 104, rather than the core acting as an obstruction for the procession of the foodstuff through the cutting tool.

To ease procession of the core through the aperture 132, the plate 116 is provided with, around the central aperture 132, an upwardly-extending (i.e. towards foodstuff that is to be processed by the cutting tool) flange 136 to receive, define and direct the core of foodstuff through the aperture 132. The flange 136 is provided with a cutting edge (e.g. straight or serrated), so as to core foodstuff as it contacts the flange 136. The flange 136 and central aperture 132 together may be referred to as a corer. To improve coring further, the flange is engaged, or integral, with the cutting tool so that the flange rotates with the cutting tool.

In order not to interfere with the procession of the core through the aperture 132, the cutting tool has no spindle coincident with the axis of rotation 112, instead the engagement formation 108 is provided away from the axis of rotation.

The cutting tool 100 comprises a further cutting member 140, in the form of a comb-like blade having spaced cutting teeth 144 for incising slits through foodstuff. The cutting teeth 144 of the comb-like blade are arranged to extend upwardly from the plate 116 and are arranged at substantially regular intervals (of around 3 mm-10 mm, or around 4 mm-6 mm) radially along the plate 116. The height of the comb-like blade 140 is shorter than the height of the engagement formation 108 that is above the plate 116; this is in order to minimise bending stresses on the comb-like blade.

The comb-like blade 140 is positioned ahead (relative to the direction of rotation of the cutting tool 100) of the cutting edge 120, such that foodstuff is first cut by the comb-like blade 140 and then by the main blade 104 as the cutting tool 100 is rotated. The comb-like blade 140 cuts along planes that are substantially perpendicular to the cutting plane of the main blade. As a result, in combination, the comb-like blade 140 and the main blade 104 thereby produce a cross-cut, resulting in multiple continuous helical ribbons (i.e. up to as many ribbons as there are cutting teeth 144) of processed foodstuff.

The number and dimensions of the ribbons of processed foodstuff produced depends on the number and arrangement of the cutting teeth 144 on the comb-like blade 140. In an example, between ten and fifteen equally spaced cutting teeth are provided. The spacing between the teeth of the comb-like blade 140 is similar or equal to the spacing between the cutting edge 120 and the plate 116, such that the ribbons have a substantially square cross section.

The comb-like blade 140 is supported on the plate 116 and coupled—for stability—to the engagement formation 108 and/or to the flange 136.

In one example, the cutting tool 100 comprises yet a further cutting member—a reversed cutting member (not shown)—provided on an opposite side of the plate 116 to the main blade 104. The reversed cutting member is orientated in an opposite direction to the main blade 104 and away from the main blade so as to prevent the reversed cutting member interfering with foodstuff passing through the aperture 128. In this way, a multifunctional cutting tool is provided since the cutting tool is available to be flipped to select whether the main cutting member or the reversed cutting member is used.

Furthermore, since the cutting tool is driveable in both clockwise and anticlockwise directions, ribbons of foodstuff processed by the main blade 104 are available to be cut to length by reversing the direction of rotation of the cutting tool (i.e. by reversing the drive of the food processor). In order to achieve this, the reversed cutting member is provided proximate to the main blade 104 so that when the cutting tool is driven in reverse, foodstuff that has passed through the aperture 128 encounters the reversed cutting member, which cuts against the foodstuff.

For example, the food processor is provided with a program in which: the cutting tool 100 is driven anticlockwise at a predetermined speed for a predetermined time period, such that foodstuff is cut by the main blade 104 and passes through the aperture underneath the main blade 104; the direction of rotation of the cutting tool 100 is then reversed, causing the reversed cutting member to cut the processed foodstuff depending through the aperture 128 under the main blade 104; and the direction of rotation is then reversed again such that foodstuff is once more cut by the main blade 104. By repeating this program, several discrete sections (i.e. as many such sections as cycles are completed) of predetermined length ribbons or strands of foodstuff are output.

In order to facilitate cleaning, the plate 116, cutting members 104, 140 (including the reversed cutting member), plate 116, engagement formation 108 and/or corer 136, 132 are detachable from one another.

Furthermore, where the plate 116 is removable from the engagement formation 108, the plate is available to be used in a modular fashion, where the plate 116 can be replaced with an alternative plate 116 (e.g. provided with a different cutting member). Alternatively or additionally, the cutting members are removable and replaceable themselves, allowing the functionality of the cutting tool 100 to be varied.

Figure 2:
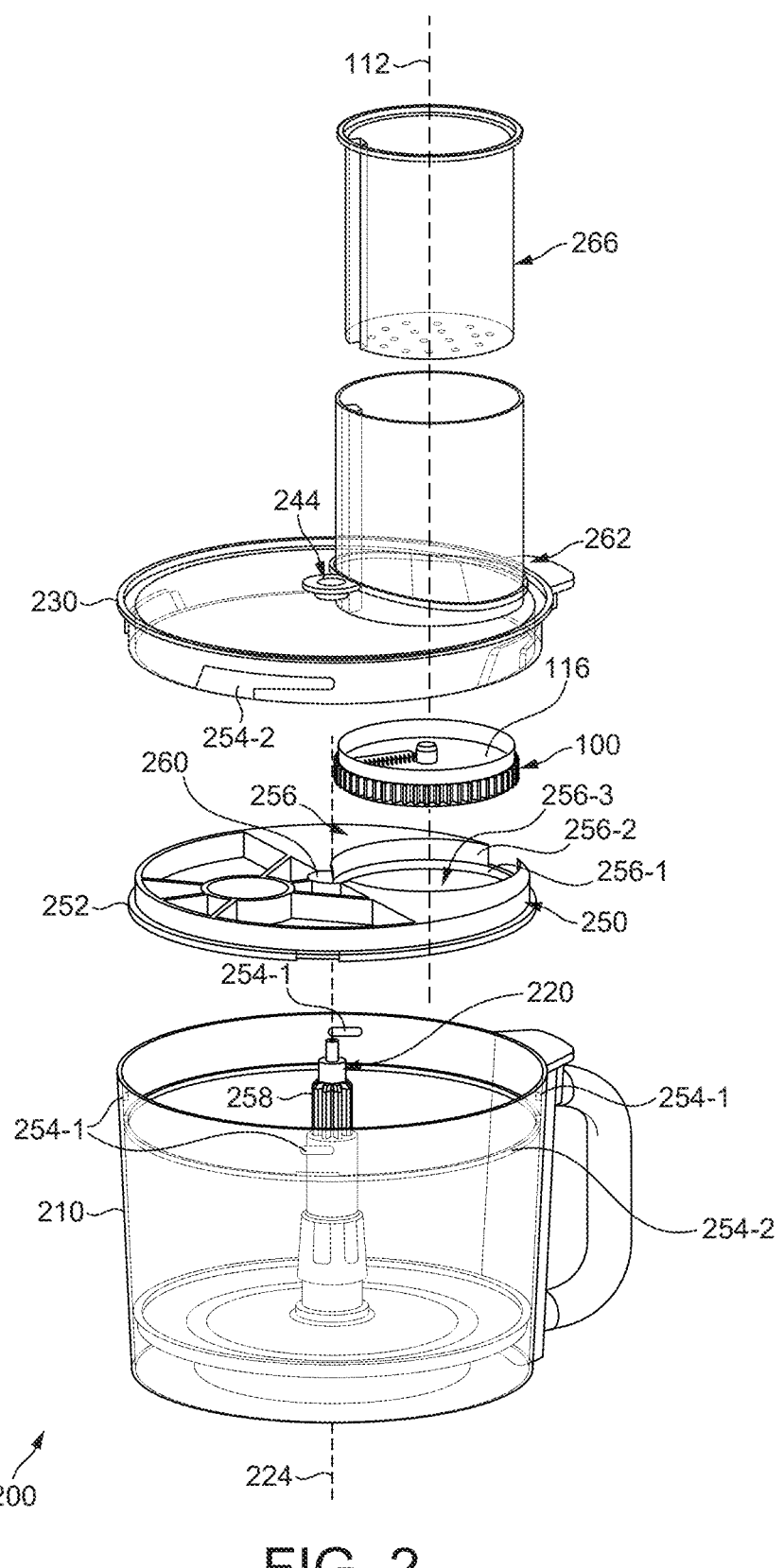
FIG. 2 shows an exploded view of a food processor incorporating the cutting tool.
Figure 3:
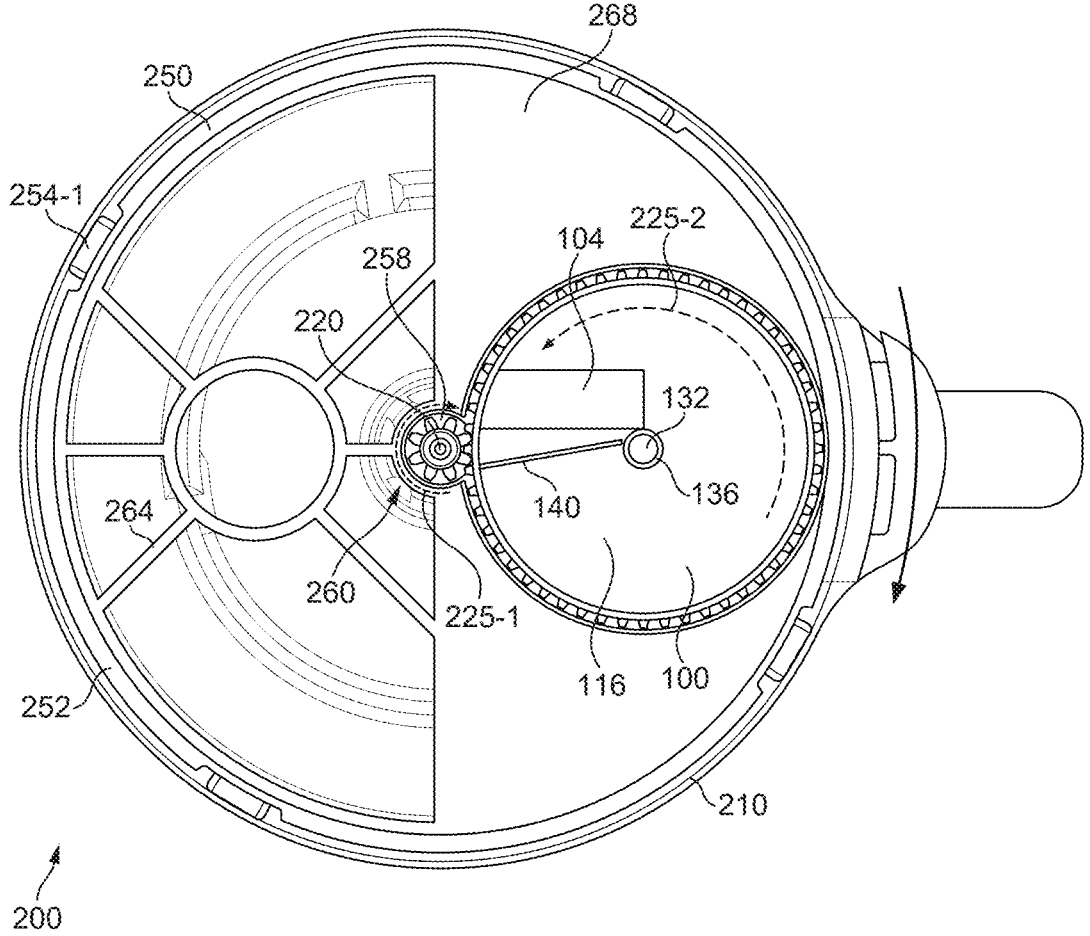
FIG. 3 shows a top view of the food processor incorporating a cutting tool, with the lid of the food processor being removed.

FIGS. 2 and 3 show a (bottom-driven) food processor 200 incorporating the cutting tool 100 within an adaptor 250 for permitting use of the cutting tool with the food processor 200.

In more detail, FIG. 2 is an exploded view of the food processor 200, cutting tool 100 and adaptor 250. The food processor 200 comprises a base (not shown) having a motor and a rotating drive outlet, a bowl 210, a drive shaft 220 rotating about axis 224 and extending through said bowl 210, and a lid 230 for engagement with the bowl 210.

Existing food processors of the kind shown in FIG. 2 are typically not suitable for spiralising, and instead their functionality is limited to blending, slicing, grating and peeling. Accordingly, in order to adapt the food processor into a spiraliser, the adaptor 250 is provided, in the form of a frame, for retrofitting to the food processor so as to allow the cutting tool 100 to be driven by the food processor 200 in a way so as to effect, at least, spiralising.

The adaptor 250 comprises a formation 252 for enabling the frame to be supported by the food processer, and specifically its bowl 210. The formation 252 is provided away from the axes 112 and 224, and instead around the periphery of the adaptor 250. For example, the formation 252 is shown in FIG. 2 as a lip (or "rim") that is configured to rest upon a flange 254-2 provided within the bowl (usually for supporting the lid 230). In this way, the adaptor is supported within the bowl; in order to do so, the adaptor is therefore dimensioned to fit within the bowl. In other examples, the formation 252 is any surface that the bowl can support, for example on the lip of the bowl, or simply an arrangement that is dimensioned to be supported by the inner or outer walls of the bowl 210.

The adaptor 250 further comprises a support 256 for the cutting tool 100 that permits the cutting tool 100 to rotate freely, for example by spinning. The support 256 is in the form of a cradle having a flange 256-1 upon which the cutting tool rests. The flange 256-1 supports the cutting tool away from its axis of rotation 112, and instead about its periphery. The support 256 is recessed since it comprises a retaining wall 256-2 surrounding the cutting tool, in this way the wall 256 acts as a retaining formation preventing the cutting tool from moving in any direction other than about and/or along axis 112. For example, the wall 256-2 prevents the cutting tool from rotating about the axis of rotation of the drive shaft 224.

The support 256 is provided with an aperture 256-3 below the cutting tool and offset from axis 224. In this way, processed foodstuff falls from the cutting tool through the adaptor and into the food processor's bowl. Preferably, the aperture 256-3 is coincident with an area traced by the main blade 104, and centred about the axis 112.

Furthermore, the adaptor 250 supports the cutting tool proximate to the rotating drive shaft 220 so as to allow the cutting tool 100 to pick up drive directly from the rotating draft shaft 220, which is typically provided with gear teeth 258, hence the engagement formation 108 intermeshes with these gear teeth 258. The adaptor 250 positions the cutting tool such that axes 112 and 224 are not coaxial; that is, these axes are offset from one another.

Adaptor 250 also comprises an aperture 260, arranged coaxially with axis 224, through which the drive shaft 220 passes. The aperture 260 overlaps with the support so as to allow the cutting tool 100, specifically its engagement formation 108, to engage directly with the rotating drive 220.

To allow the cutting tool 100 to rotate when docked in the adaptor 250, the support 256 is provided with a bearing. For example, as shown in FIG. 2, the bearing is a plain bearing, in the form of the flange 256-1; that is, a surface having no moving parts, but simply a sufficiently low-friction surface (e.g. PTFE) and/or a sufficiently low surface area so as to allow the cutting tool to spin without excessive wear and heat generation. In another example, the bearing comprises a rolling mechanism, such as ball bearing, and in yet a further example the bearing is provided—in addition or alternatively to the bearing on the adaptor—on the cutting tool 100.

Figure 10:
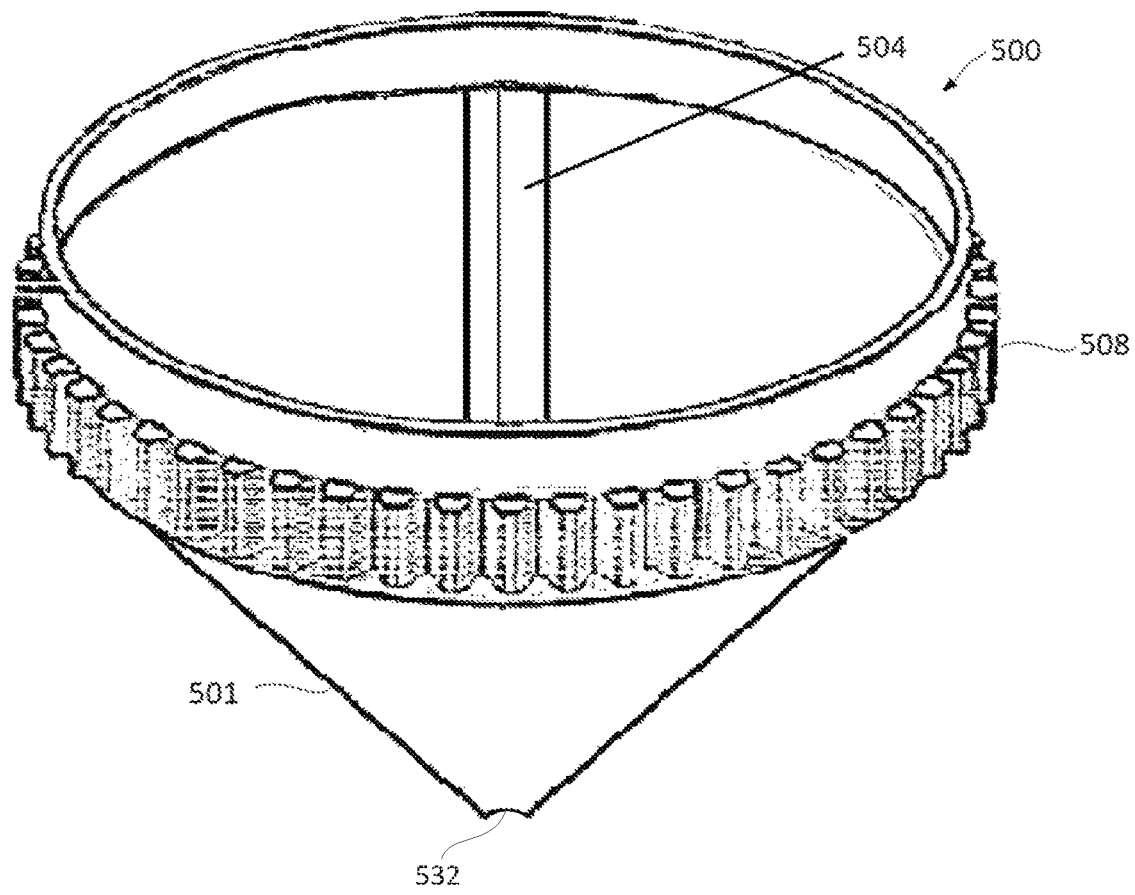
FIG. 10 shows a cone-shaped cutting tool.

An alternative rotatable cutting tool 500 is shown in FIG. 10. The cutting tool 500 is similar to the disc shaped cutting tool 100 of FIG. 1, but is instead cone shaped. The cutting tool 500 has a cutting cone 501 upon which the cutting member in the form of a cutting blade 504, similar to the cutting blade 104 of the cutting tool 100, is mounted. The blade extends towards a central aperture 532 of the cone 501. The cutting tool 500 has an engagement formation 508 extending around the periphery for picking up drive, as described in relation to the disc shaped cutting tool 100.'

As is typically the case, the bowl 210 is cylindrical, accordingly the adaptor 250, and more specifically the formation 252, conforms to the shape of the bowl so as to maximise—for a secure fastening—the contact area between bowl and adaptor. Other shapes of bowl are known, accordingly non-circular adaptors are also available, including rectangular and elliptic adaptors.

As is also known, the lid 230 and bowl are arranged to engage with one another so as to create an enclosure within the bowl 210.

The adaptor 250 is configured so as not to interfere with any formations for permitting engagement of the lid to the bowl by being suitably dimensioned or by mimicking these formations so that the lid is available instead to engage with the bowl via the adaptor. As shown in FIG. 2, the adaptor is dimensioned, by being adequately shallow and narrow, to receive the lid and not to obstruct a locking mechanism (comprising flanges 254-1 in the bowl and cooperating grooves 254-2 on the lid) for the bowl and lid.

Lids of food processors are typically provided with an inlet chute 262 for foodstuff extending upwardly away from the lid 230 and offset from the axis of the rotating drive 224. The lid 230 further comprises a boss 244 to which the shaft 220 is journaled. A pusher 266 for the inlet chute 262 is also typically provided to allow a user to urge foodstuff, through the chute 262, towards the bowl.

Accordingly, the support 256, and hence the cutting tool, is aligned with the inlet chute 262. Furthermore, the support is coaxial with the inlet chute 262 so that the axis of rotation 112 of the cutting tool 100 is coincident upon, and aligned substantially with, inlet 262. In this way, the cutting tool 100 receives foodstuffs from the inlet 262 over a maximal surface area of the plate 116 and so foodstuff is also available to be coincidental with axis 112 when in contact with the cutting tool, which in turn permits spiralising. The cutting tool 100 (and hence support 256) is dimensioned to be, at least, as wide as the inlet chute 262 so as to maximise the working area of the cutting tool 100.

FIG. 3 is a top view of the adaptor 250 engaged with the food processor 200 without the lid 230. As best seen in FIG. 3, when the shaft 220 is rotated in a clockwise direction 225-1 (when viewed from above), as a result the cutting tool is therefore rotated counter-clockwise 225-2.

The adaptor is formed to comprise a solid section 268 extending across half the bowl and the other half is provided with ribs 264 for strength. The adaptor as a whole is formed to resist the force of foodstuff being urged onto the cutting tool 100.

FIGS. 4 to 8 show an alternative example of an adaptor 350 for a food processor, and specifically for a stand mixer 400.

Figure 4:
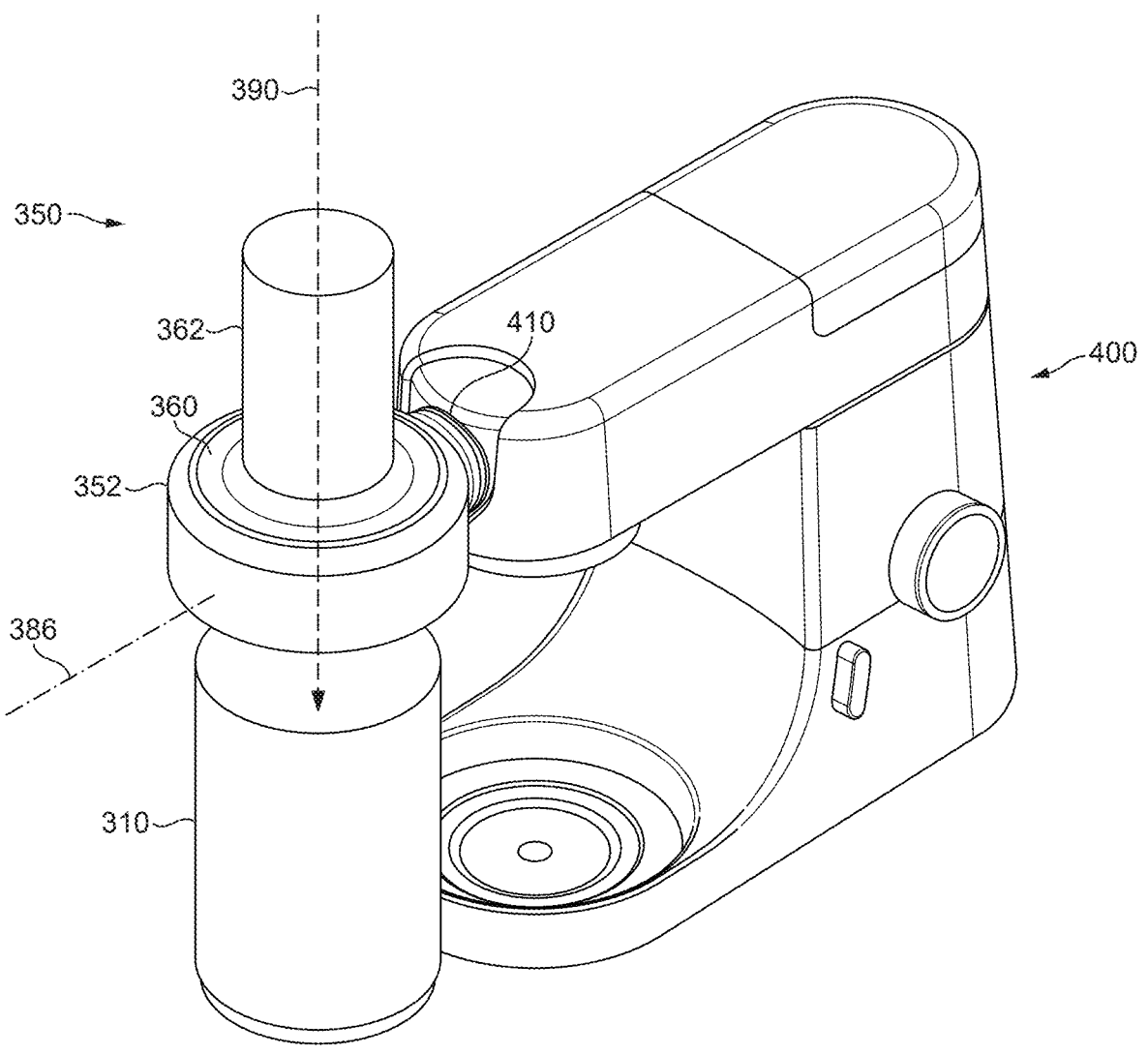
FIG. 4 shows a perspective view of an attachment incorporating the cutting tool in engagement with another example of a food processor-a stand mixer.

In more detail, FIG. 4 shows a perspective view of the adaptor 350 with the stand mixer 400 (or similar kitchen machine having a horizontal drive output) for, incorporating the cutting tool 100, and engaged with the stand mixer 400.

The stand mixer 400 may be provided with a rotating drive 410 for attachments (such as blenders, meat grinders and spice mills) on a front, side, top, or rear surface of the stand mixer and the rotating drive may be a slow-speed drive.

The adaptor 350 comprises a frame 352, a formation 356 for enabling the frame to be supported by the stand mixer, and a support 365 for the cutting tool 100.

As with the example shown in FIGS. 2 and 3, the frame 352 is configured to permit the cutting tool 100 to pick up drive from the rotating drive 410 so as to allow the cutting tool 100 to rotate about an axis 390 that is offset from the axis of rotation 386 of the rotating drive 410 (in this case such that the axes are substantially perpendicular to one another).

In order to engage with the stand mixer 400, the formation 356 forms part of a coupling, in the form of sprung members on the adaptor for locking into a cooperating socket on the stand mixer.

In this example, and unlike in the example of FIGS. 2 and 3, the adaptor 350 includes an engagement formation 355 for picking up drive from the rotating drive 410 of the food processor. The engagement formation 355 is in the form of a square spindle.

The adaptor 350 also includes transmission 359 for transmitting drive from the engagement formation 355 to the cutting tool 100.

In the example shown, the support 365, which is in the form of a ring gear, is part of the transmission 359. By means of engaging gears and drive shafts, rotational drive is transmitted from the engagement formation 355 to the support. The ring gear supports the cutting tool 100, at its periphery, by intermeshing with the engagement formation 108 of the cutting tool. In this way, the ring gear supports the cutting tool at its periphery so as to pick up drive away from its axis of rotation 390.

The frame 352 is provided with an aperture 325 arranged coaxially with the support 365, and hence also the cutting tool.

The adaptor 350 further comprises a lid 360 for engagement (for example, by means of a bayonet coupling) with the adaptor so as to obstruct access to the aperture 325 from above.

The lid 360 comprises an inlet chute 362 aligned with the cutting tool, and therefore also aligned with the support 365 and aperture 325. In this way, a central axis of the inlet chute 362 is aligned with the axis of rotation 390 of the cutting tool 100.

For safety, the frame is provided with a plurality of engagement formations for engaging with the lid 360, such as bayonet flanges 358. The lid 360 is provided with corresponding engagement formations, in the form of cooperating groves (not shown), to lock the lid 360 to the adaptor 350.

To collect processed foodstuff, the adaptor 350 further comprises a container 310 for positioning directly below the cutting tool 100. The adaptor 350 and container 310 are also provided with cooperating engagement formations so as to couple together. Alternatively the container stands alone.

Figure 5:
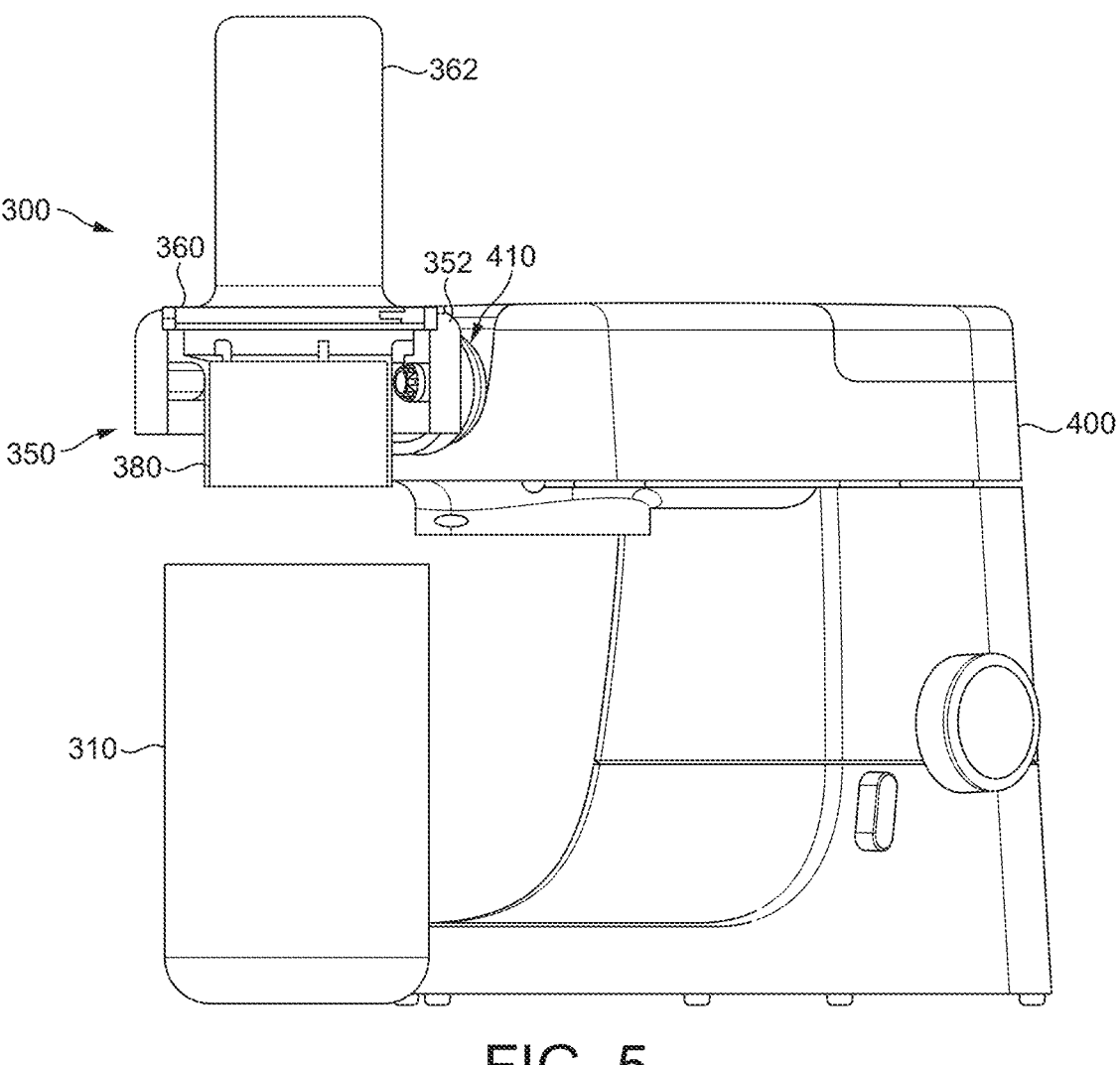
FIG. 5 shows a partial cutaway side view of an attachment incorporating the cutting tool in engagement with the stand mixer.

FIG. 5 shows a partial cutaway side view of the adaptor 350 in engagement with the stand mixer 400. As best seen in FIG. 5, to help guide foodstuff into the container and to keep processed foodstuff away from the mechanisms of the adaptor, the adaptor includes a cylindrical outlet chute 380 arranged between the container 310 and the support 365.

Figure 6A:
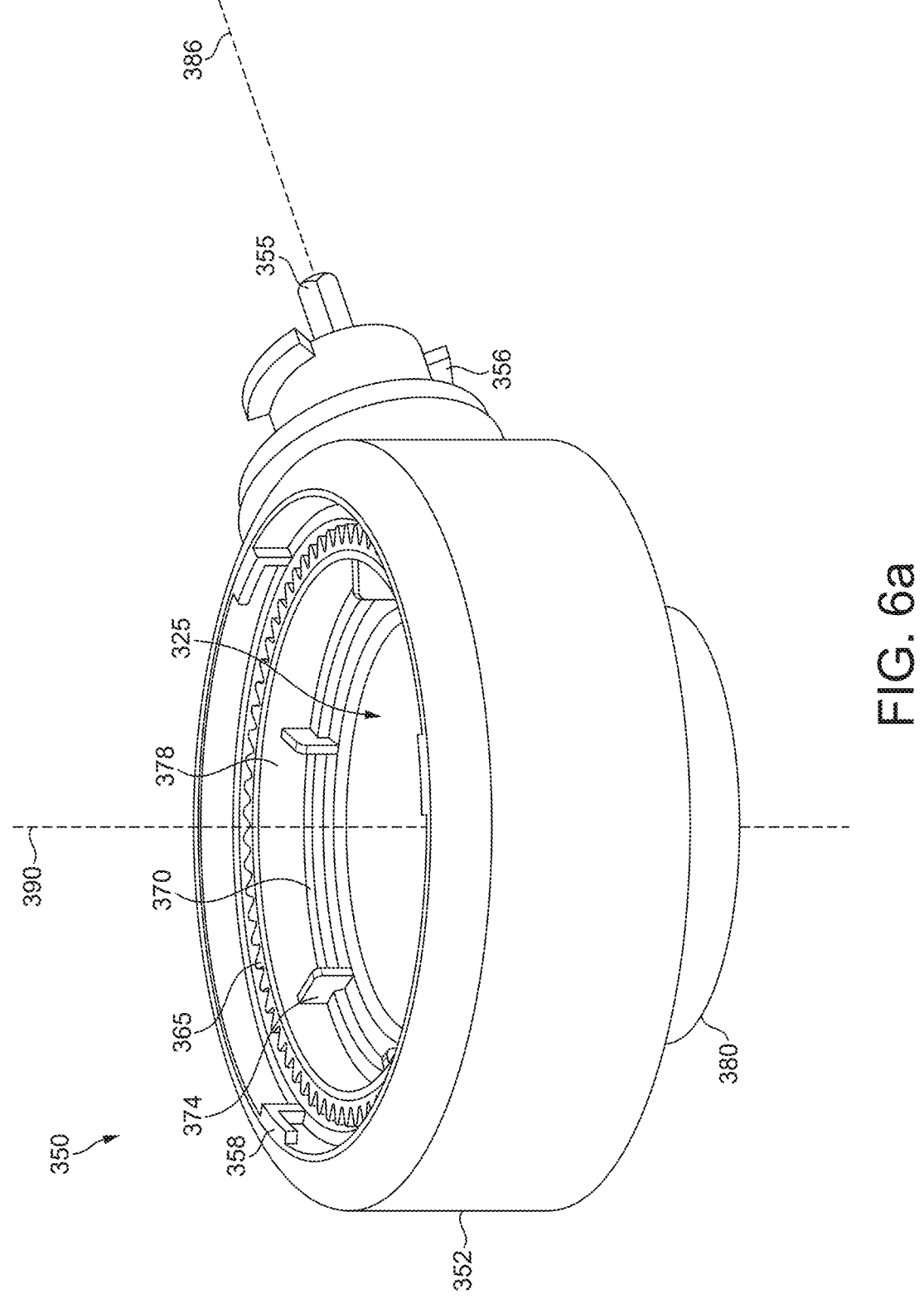
FIG. 6a shows a perspective view of an adaptor of the attachment.
Figure 6B:
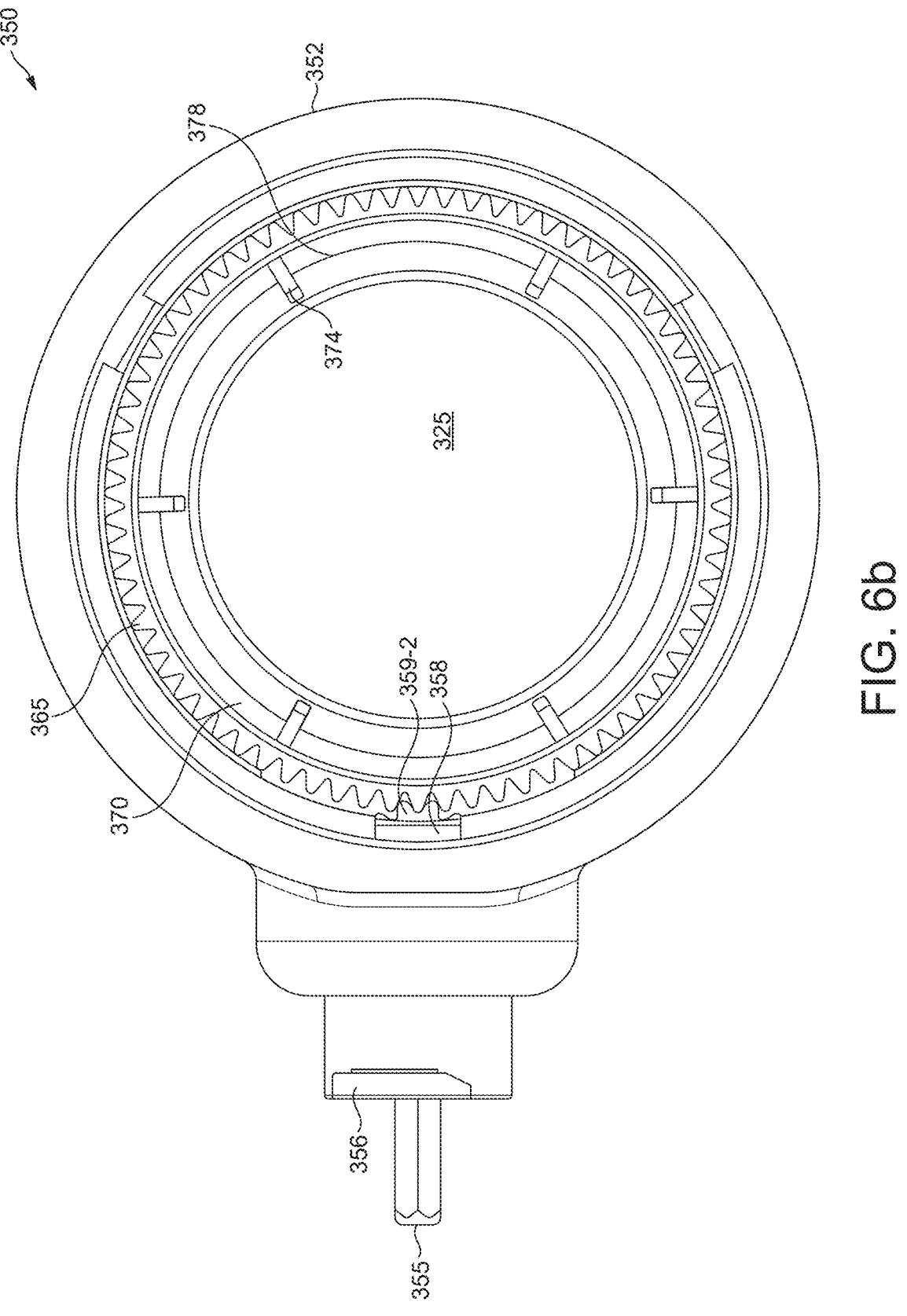
FIG. 6b shows a top view of the adaptor

FIGS. 6a and 6b show a perspective and top view respectively of a portion of the adaptor 350. As best seen in FIGS. 6, the support 365 comprises several flanges 374 formed into the ring gear and spaced equally around the inner perimeter of the ring gear. As the ring gear rotates, the flanges 374 also rotate. The flanges are provided to support, from below, the cutting tool 100 which is available to rest directly upon the upper surface of the flanges or to engage with the flanges by allowing the flanges to slot into a cooperating slit in the cutting tool (such as the root of the gears of the engagement formation 108). In the latter case, a lip 370 extending inwardly from the ring gear instead supports the cutting tool from below.

The support 365 acts as a retaining member by means of a retaining wall 378 formed by inner surface of the ring gear which surrounds the perimeter of the cutting tool when in situ in the support. In this way, the retaining wall 378 permits the cutting tool only to move along or about axis 390.

Figure 7:
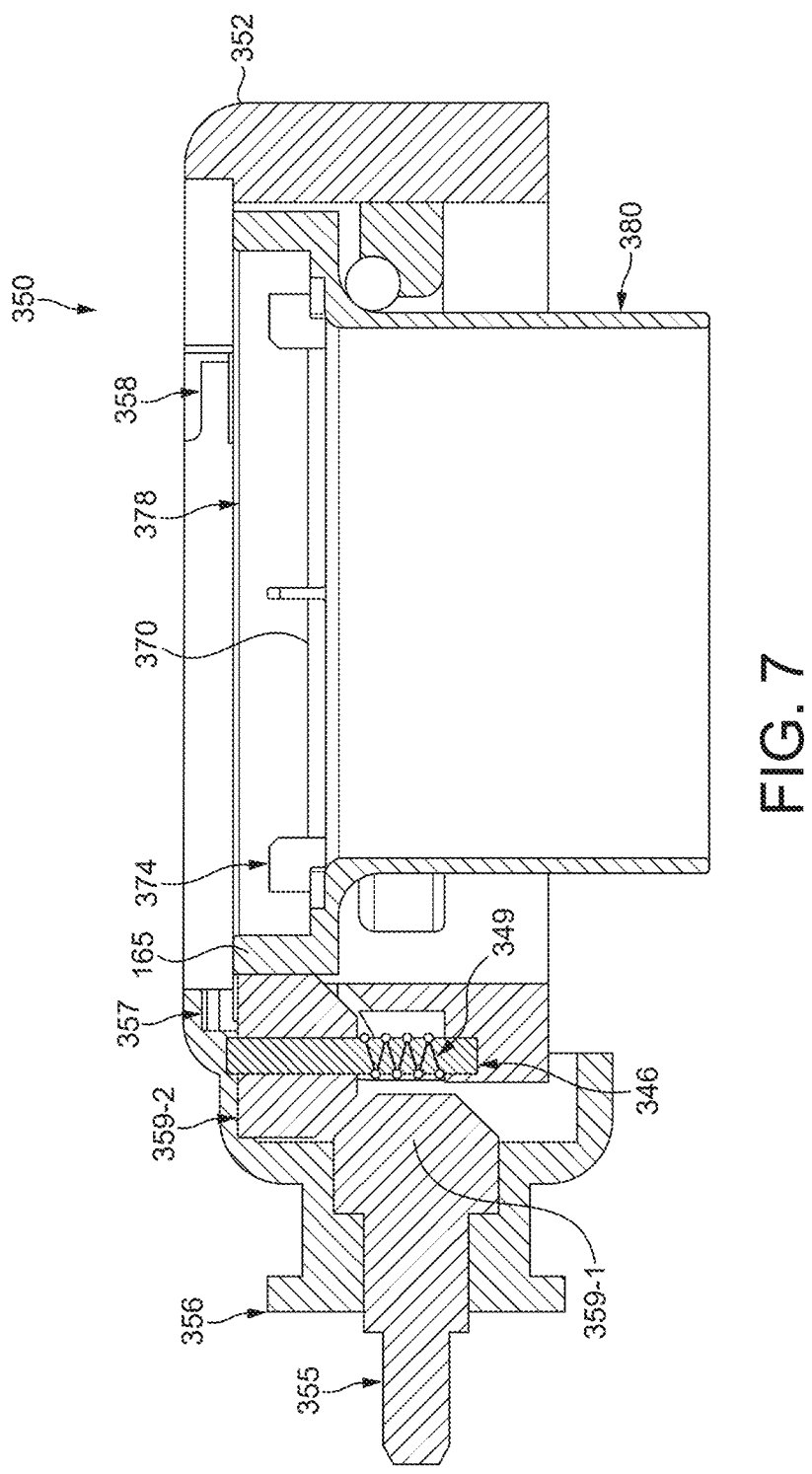
FIG. 7 shows a schematic cutaway side view of the adaptor.

FIG. 7 shows a schematic cutaway side view of the adaptor 350. Drive is transmitted by the transmission 359—that is, the engagement formation 355, a first 359-1 and a second bevel gear 359-2, and the ring gear 365.

In more detail and as best seen in FIG. 7, the first bevel gear 359-1 is attached directly to the engagement formation 355, at an end of the engagement formation 355 nearest the ring gear 365. The second bevel gear 359-2 is orientated so as rotate about an axis that is parallel to axis 390 and perpendicular to the axis of rotation of the first bevel gear 359-1. The second bevel gear 359-2 extends between the first bevel gear 359-1 and the ring gear 365 and transmits drive between the first bevel gear 359-1 and the ring gear 365. The first and second bevel gears 359-1, 359-2 thereby pick-up and translate drive from the engagement formation 355 perpendicularly.

FIG. 7 also shows a drive safety interlock for use with an attachment for a food processor whereby the attachment picks-up drive from the food processor. For example, the attachment with which the safety interlock may be incorporated is shown as adaptor 350 in FIG. 7. As part of the interlock, the second bevel gear 359-2 is mounted on a spindle 346. The spindle 346 is arranged to travel in a channel (not shown) so as to allow the second bevel gear 359-2 to be raised and lowered. In an alternative example, where the second bevel gear 359-2 is not fixedly mounted to the spindle, the spindle is fixed, and instead the second bevel gear is journaled for travel along the spindle.

When the second bevel gear 359-2 is raised clear of the first bevel gear 359-1, the second bevel gear disengages from the first bevel gear 359-1 and/or the ring gear 365. In order for the interlock to operate effectively as a safety feature, the spindle 346 is provided with a coil spring 349 for urging the spindle, and hence the second bevel gear, away from the first bevel gear. The second bevel gear 359-2 is thereby disengaged from the first bevel gear when the spring is uncompressed.

The second bevel gear 359-2 is provided with a cooperating member 357 that is separate to the second bevel gear 359-2 and that protrudes upwardly from the second bevel gear 359-2. An upper surface of the member 357 is ramped. The member 357 extends through an aperture (not shown) in the frame 352 when the spring is uncompressed, such that the member 357 is exposed and proximate to bayonet flanges 358.

Figure 8A:
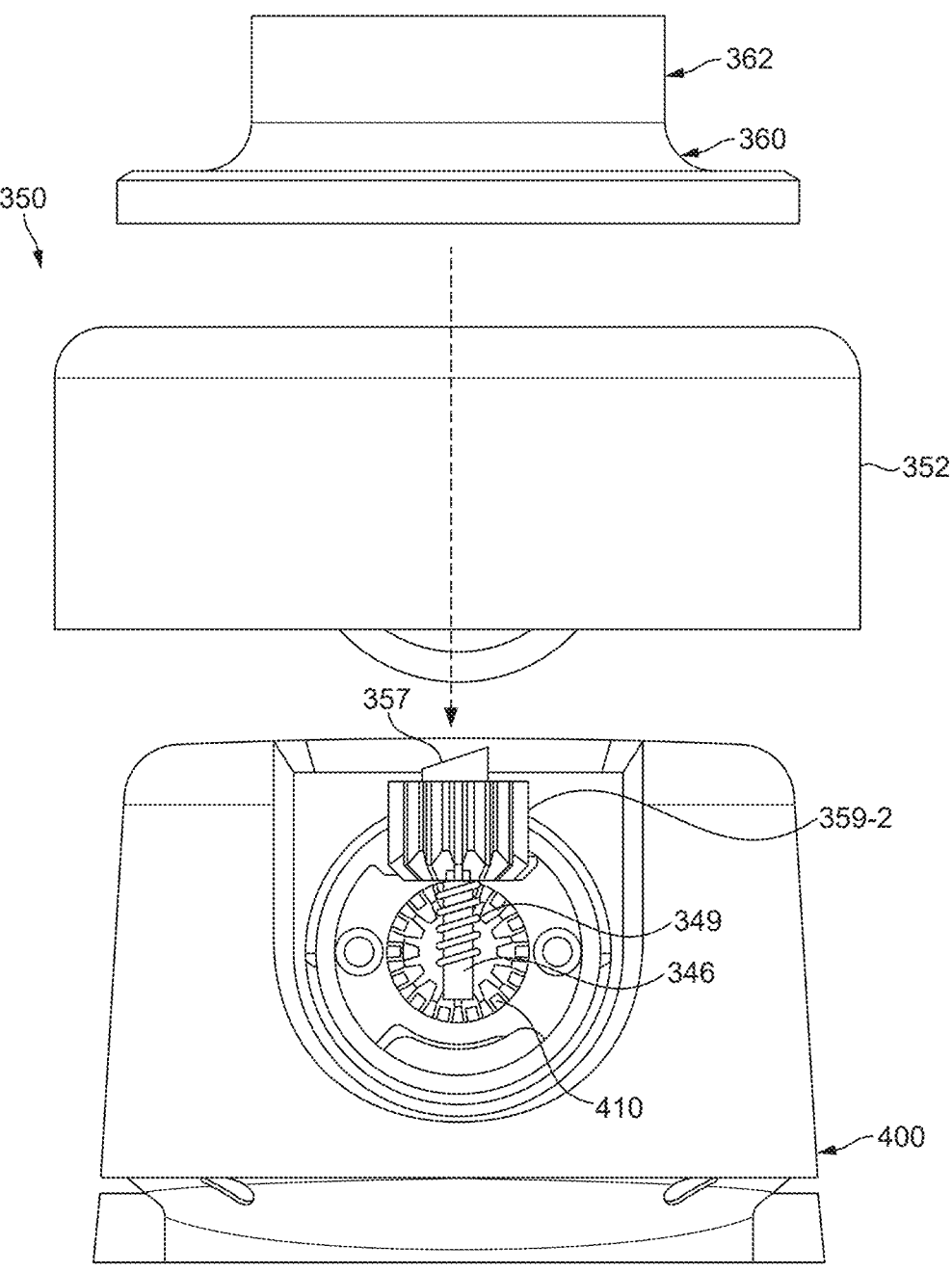
FIG. 8a shows a schematic partial exploded view of the attachment and the stand mixer from the front.
Figure 8B:
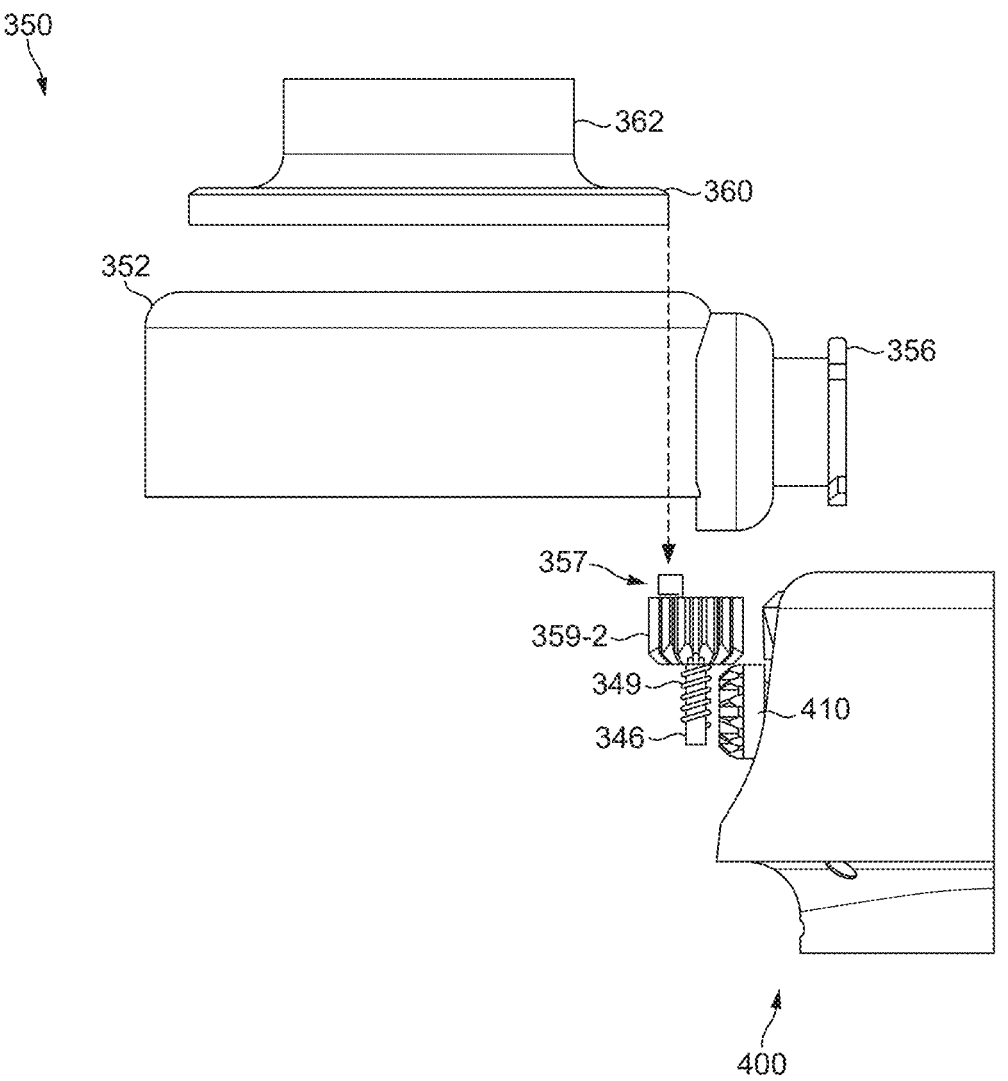
FIG. 8b shows a schematic partial exploded view of the attachment and the stand mixer from the side.

As best seen in FIGS. 8a and 8b, which show schematic partial exploded views of the adaptor 350 and stand mixer 400 (albeit with certain features omitted for clarity), the member 357 cooperates with the lid 360, and specifically with the bayonet grooves on the lid for coupling with bayonet flanges 358. In this way, as the lid 360 is locked to the adaptor 350 by engaging the bayonet coupling, at least one of the bayonet features on the lid 360 slides over the ramped surface of the member 357. When the lid is fully locked into the adaptor 350, the spindle 346 and second bevel gear 359-2 are depressed against the spring 349 and into engagement with the first bevel gear 359-1 and the ring gear 365. The lid 360 retains the second bevel gear depressed and in engagement with the first bevel gear and ring gear.

The member 357, which is offset from the axis of rotation of the second bevel gear 359-2, slides in an annular slot or runner (not shown) on the second bevel gear 359-2. Accordingly, the member 357 remains static as the second bevel gear rotates when the lid 360 is engaged.

As shown in FIGS. 7 and 8, the transmission 359, spring 349 and member 357 provide a safety interlock that prevents drive from being transmitted to the cutting tool 100 unless the lid 360 is correctly engaged with the adaptor 350. When the adaptor 350 is fitted to the stand mixer 400 without the lid 360 and the rotating drive 410 is operational, the engagement formation 355 will spin idly until the lid 360 is fitted, causing the first 359-1 and second bevel gears 359-2 to engage.

Figure 9:
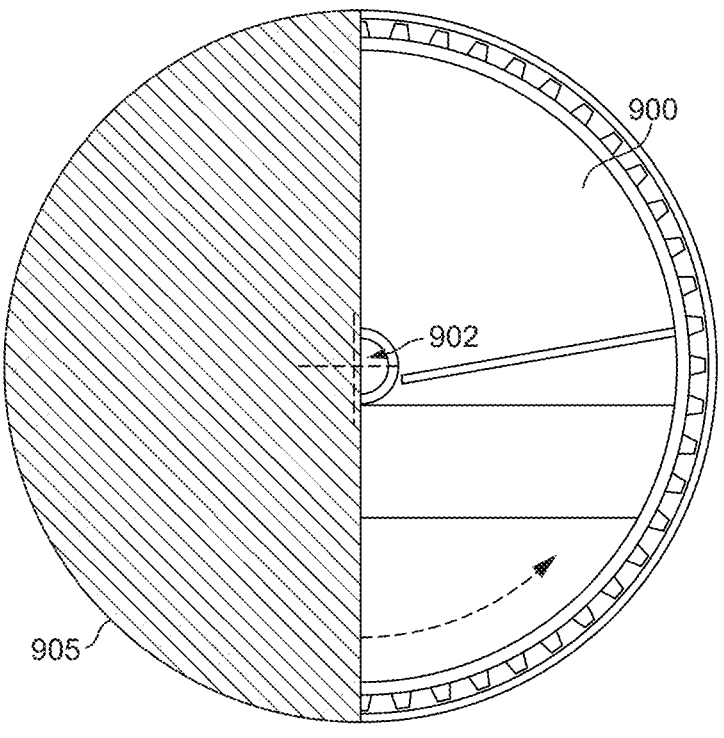
FIG. 9 shows a schematic view of an inlet chute.

FIG. 9 shows a schematic view of a blocking member 905 for use with adaptors 250, 350 and/or the cutting tool 100. The adaptors 250, 350 are arranged to locate the cutting tool 100 beneath the inlet chute 262, 362 such that the cutting plate 100 receives foodstuff all around its axis of rotation

112; this allows the cutting tool 100, with the main blade 104 arranged across, at most, a radius of the plate 116, to cut foodstuff into a continuous strand (rather than separate slices every revolution).

The blocking member 905, which is available for fitment within, over or around inlet chutes 262, 362, limits the positions at which foodstuff may be inserted into the inlet chute and presented to the cutting tool. The blocking member 905 is dimensioned to block foodstuff from coinciding with, at least, the axis of rotation 112 of the cutting tool 100 when foodstuff is pressed against the cutting tool. For example, in FIG. 9, the blocking member is shown as being a substantially semi-circular plate centred on the axis of rotation 112.

In an alternative, the entire inlet chute 900 is replaceable with an inlet chute that offsets foodstuff from the axis of rotation 112.

Provision of the blocking member 905 to block axis 112 therefore adapts the cutting tool 100 for discontinuous cutting of foodstuff, such that the cutting tool 100 processes foodstuff once every revolution per cutting member, and not continuously within a revolution. This increases the functionality of the cutting tool 100 by allowing the cutting tool 100 to be used for slicing or grating functions, for example. In such cases, the comb-like blade 140 is removed from the cutting tool, leaving the main blade 104 to slice.

ALTERNATIVES AND MODIFICATIONS

In one example, the aperture 260 of the adaptor 250 has a diameter that is substantially the same as the diameter of the drive shaft 220, at the point where the drive shaft is received by the adaptor. In this way, the drive shaft 220 is journaled by the adaptor 260.

In one alternative the cutting members 104, 140 (and the reversed cutting member) comprise at least one of: a straight blade; a curved blade; a comb-like blade; a serrated blade; a julienne-type blade; and grater slots.

In another example, the cutting tool 100 is provided with a central prong or wedge on the plate 116 in place of the corer. The prong or wedge is arranged to split foodstuff as it is urged onto the plate and direct it outwardly toward the main blade 104 instead of through the aperture 132.

Although the plate 116 has been described as being a flat disk, it will be appreciated that other shapes of plate 116 are available. For example, a conic or domed cutting 'plate' 116 is available with the cutting members conforming substantially to the plate 116.

In yet a further alternative, the support 256, 365 is provided with a hollow spindle cooperating with the aperture 260 which journals the cutting tool. In this case, the retaining wall 256-2, 378 may be foregone.

Where the adaptor 350 is arranged for use with a stand mixer 400 (as in FIGS. 4 to 7), the support 365 is available to be distinct to the transmission 359. For example, the support is available to be the lip 370, whereas the transmission 359 comprises a drive shaft provided adjacent the support, for example much as is shown in and described with reference to FIGS. 2 and 3; in this way user safety is improved since the moving parts of the transmission 359 may be smaller and less accessible.

It will be appreciated that although the use of bevel gears 359-1, 359-2 has been described in relation to the transmission mechanism 359 and the safety interlock mechanism, other forms of drive, such as belts, rotating shafts, worm gears and/or helical gears may alternatively be employed.

Alternatively, the adaptor is provided with any cooperating formation for engaging with the stand mixer so as to be supported by the stand mixer, such as a screw lock or lathing mechanism.

In an alternative, double-helix ribbons or strands are available to be output by providing the cutting tool 100 with a reversed cutting member on the same face of the plate 116 as the main blade 104, but orientated in an opposite direction and positioned diametrically opposite—i.e. on the other side of the aperture 132 to—the main blade 104.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A food processor accessory comprising:
   a cutting tool including:
      a cutting member;
      a generally circular plate, wherein the cutting member is mountable thereon; and
      a ring gear extending circumferentially around the circular plate;
   an adaptor configured to be supported by a food processor, the adaptor including an upwardly open cradle configured to support the cutting tool for rotation within the cradle, the upwardly open cradle including:
      an opening extending through the adaptor;
      a retaining wall configured to at least partially surround the cutting tool; and
      an inward flange around the opening configured to support the cutting tool, wherein the cutting tool is only supported from below the cutting tool;
   wherein the adaptor further includes an aperture for receiving a rotating drive of the food processor, the aperture sized to receive gear teeth of the rotating drive upwardly therethrough when the adaptor is supported by the food processor, the aperture overlapping with the cradle to provide driving engagement between the ring gear and the gear teeth of the rotating drive in an assembled condition;
   wherein the cutting tool is configured to be received within the cradle allowing upward removal of the cutting tool, including the cutting member, the plate, and the ring gear, from the adaptor, and wherein the gear teeth of the rotating drive are configured to be received within the aperture from below when the frame is supported by the food processor.

2. The food processor accessory according to claim 1, wherein, when the cutting tool is received within the cradle, the cutting tool has an axis of rotation that is offset from, and parallel with, an axis of rotation of the rotating drive.

3. The food processor accessory according to claim 1, wherein the adaptor is configured to be coupled to a bowl of the food processor.

4. The food processor accessory according to claim 3, wherein the adaptor is configured to be interposed between the bowl of the food processor and a lid of the food processor.

5. The food processor accessory according to claim 4, wherein the adapter is configured to substantially align the cutting tool, in an assembled condition, with a food chute included in the lid.

6. The food processor accessory according to claim 5, wherein the adapter is configured to position the cutting tool to receive foodstuff via the food chute generally coincidental with an axis of rotation of the cutting tool to produce a generally helical ribbon of processed foodstuff.

7. The food processor accessory according to claim 1, wherein the ring gear only interacts with the gear teeth of the rotating drive.

8. The food processor accessory according to claim 1, wherein the cutting tool further comprises a corer arranged coaxially with an axis of rotation of the cutting tool.

* * * * *